May 4, 1954 W. VAN GUILDER 2,677,405
FOOD GRINDER ATTACHMENT FOR MIXERS
Filed Jan. 27, 1950 3 Sheets-Sheet 1

INVENTOR
WALTER VAN GUILDER
BY William C. Babcock
ATTORNEY

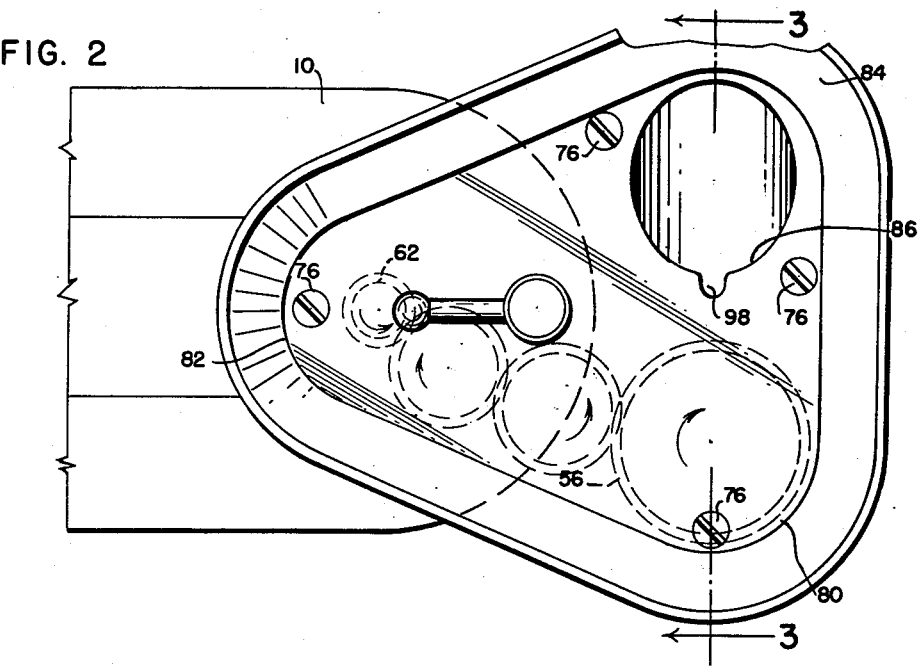
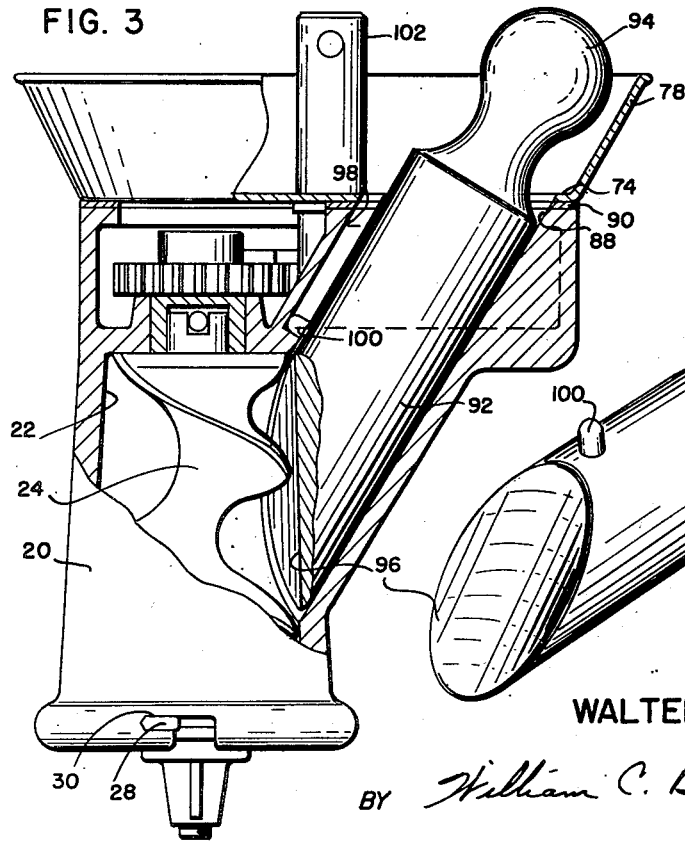
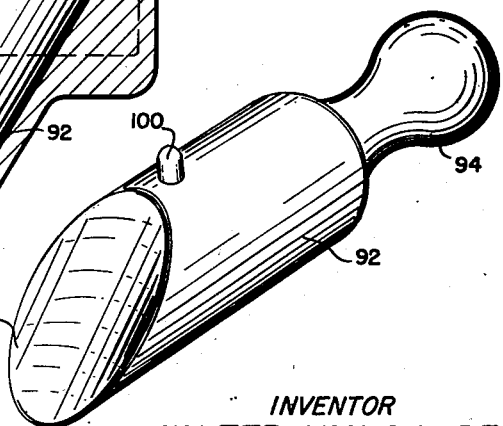

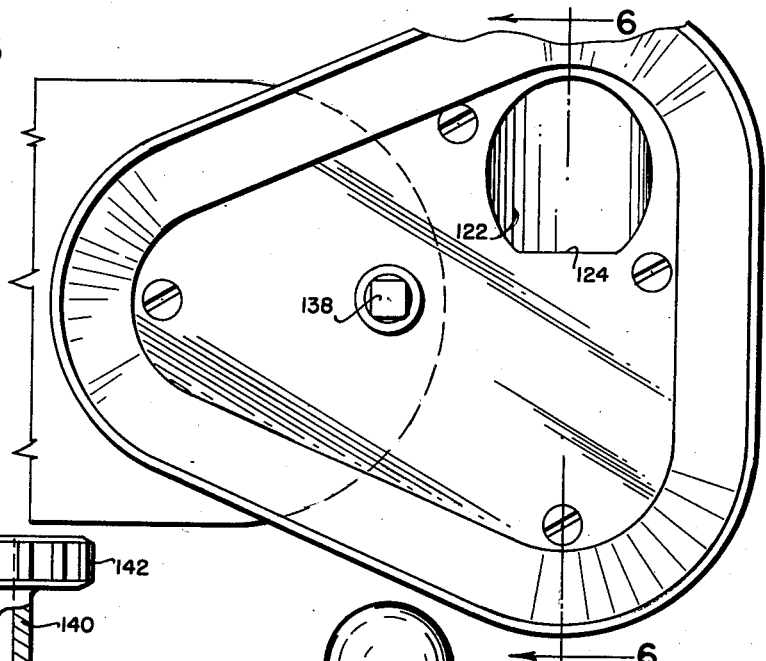
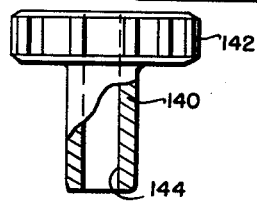
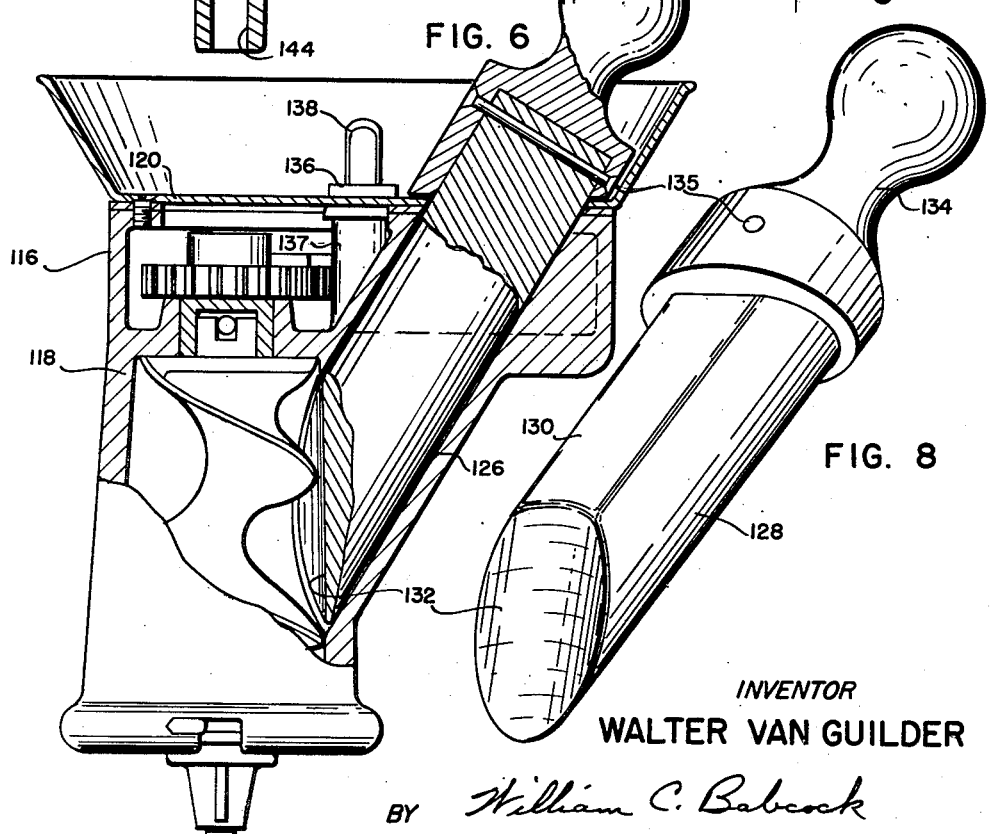
INVENTOR
WALTER VAN GUILDER
BY William C. Babcock
ATTORNEY Patented May 4, 1954

2,677,405

UNITED STATES PATENT OFFICE 2,677,405

FOOD GRINDER ATTACHMENT FOR MIXERS

Walter Van Guilder, River Forest, Ill., assignor to General Mills, Inc., a corporation of Delaware Application January 27, 1950, Serial No. 140,778

2 Claims. (Cl. 146—192)

The present invention relates to household food mixers and particularly to an improved food grinding attachment for such a mixer.

Food or meat grinding attachments have been proposed in the past for use with mixers of the household type. In most of these attachments the usual feeding worm of the grinder is rotatable on a horizontal axis. Such attachments deposit the ground food at a considerable distance from the mixer so that it is necessary to use a separate bowl rather than the usual mixing bowl itself. Food grinding attachments have also been proposed in which the worm shaft was disposed vertically, but such attachments have been limited in application to the type of mixer in which egg beaters and other attachments are driven by a shaft passing upwardly through the bottom of the bowl.

It is accordingly one object of the present invention to provide an improved food grinding attachment of the vertical worm type, which will be suitable for use with a mixer of the overhead drive style, i. e., a mixer in which a motor or gear casing is located above the mixing bowl as a source of power for the beaters or other attachments.

Another object of the invention is the provision of a food grinding attachment having an open-topped gear housing and a cover plate which constitutes a supply hopper for the device.

Another object is the provision of such an attachment with a substantially triangular housing in which the grinding worm, power input or drive shaft, and feed passage are located at the respective corners of the triangle.

A further object is the provision of a grinder of the vertical shaft type in which the feed passage for introduction of material to the grinding head is at least as close to the point of connection of the attachment to the mixer casing as is the grinding head itself.

Still another object of the invention is the provision of a food grinder having a feed passage intersecting the grinding head at an acute angle and having a pusher member of improved construction for forcing the material through the feed passage.

Other objects and advantages will be apparent from the following specification in which certain preferred embodiments of the invention are described. In the drawings which form a part of the specification, and in which like reference characters indicate like parts, Figure 1 is a partial side elevation, with certain portions broken away for clearness, of a food grinding attachment according to the present invention mounted on the gear casing of an overhead type mixer;

Fig. 2 is a partial top plan of the device of Fig. 1;

Fig. 3 is a front elevation, with certain portions broken away to the section line 3—3 of Fig. 2;

Fig. 4 is a perspective view of the improved pusher member according to the invention;

Fig. 5 is a partial top plan of a modified embodiment of the invention;

Fig. 6 is a view similar to Fig. 3, showing the device of Fig. 5;

Fig. 7 is a view of an auxiliary fastening member for the device of Fig. 5; and

Fig. 8 is a perspective view of a modified form of pusher.

Figure 1:
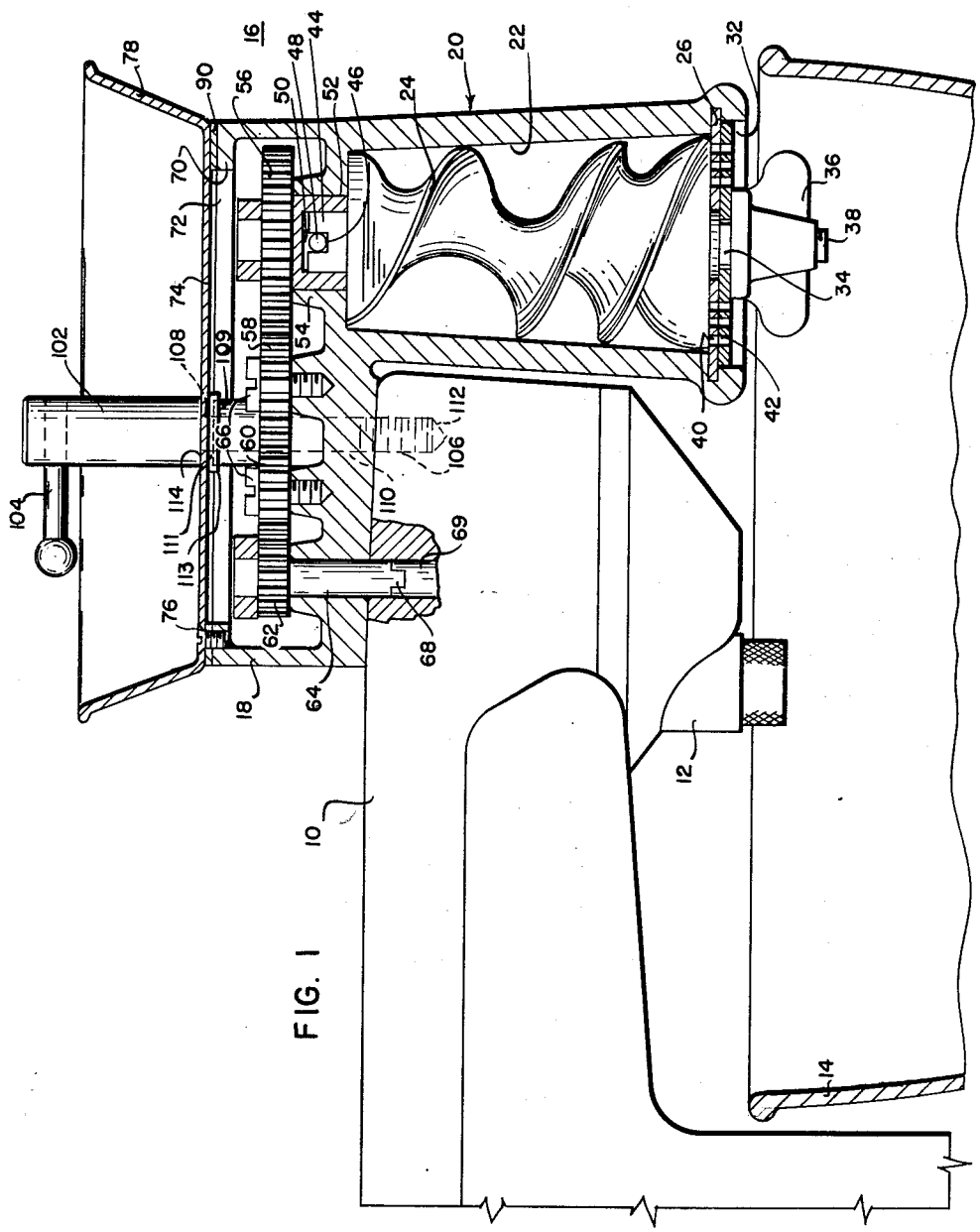

With reference to Fig. 1, the device has been shown in combination with a mixer having an overhead type of motor or gear casing 10 located above a mixing bowl 14. The mixer includes one or more beater drive shafts 12 of known construction. In the present case the beater shaft 12 is of the planetary type.

The food grinding attachment 16 includes a main body portion or gear housing 18. A grinder head 20 of standard construction projects downwardly as an integral extension from one corner of the housing 18.

Thus the grinding head extension 20 includes a vertical passage 22 which is open at its lower end. A feed worm 24 is mounted in the passage 22 for rotation on a substantially vertical axis. A stationary cutter plate 26 is mounted in the end of the grinding head extension 20 below worm 24 and serves to retain the worm in position. Plate 26 is removably attached to the extension 20 by virtue of the projections 28 on plate 26, which engage bayonet slots 30 in extension 20 (Fig. 3).

A standard rotary cutter plate 32 is keyed to the non-circular shaft portion 34 of worm 24 just below the stationary cutter plate 26 and is held against plate 26 by a lock nut 36 engaging the threaded end 38 of the worm shaft. The stationary and movable cutter plates 26 and 32 are provided with suitable openings 40 and 42 through which the material is extruded by worm 24 and severed in known manner.

The upper end of the worm 24 includes a shaft extension 44 provided with a cross slot 46 for driving engagement with pin 48 in the socket 50 of drive shaft 52. Drive shaft 52 is mounted in a bearing portion 54 of the main body or gear housing 18. A gear 56 on the drive shaft 52 is operatively connected by intermediate gears 58 and 60 to the driving pinion 62 on power shaft 64. The intermediate or idler gears 58 and 60 are held in position on bearing projections in the gear casing by retaining screws 66 which also serve as bearing shafts.

Power shaft 64 is provided with a power connection at its lower end. In this case the power connection is in the form of a diametrical extension 68 adapted to engage a cross slot in a rotatable power take-off shaft 69 in the mixer unit 10. Thus, with the parts in the position of Fig. 1, operation of the mixer unit 10 will cause rotation of shaft 69 in known manner and will thus rotate the worm 24 through the power shaft 64 and intermediate gearing just described.

At its upper edge, the gear casing or housing 18 is provided with an internally directed flange 70 which provides a top opening 72. Flange 70 serves as a seat for a cover member 74 which is fastened to the housing 18 by screws 76. A sealing gasket 80 is provided to prevent the undesired escape of lubricant and also to prevent contamination of the lubricant within the gear housing by particles of food.

Cover member 74 includes an upstanding flange 78 which in this case is located around the periphery of the cover 74. Flange 78 cooperates with the cover portion 74 to provide a supply hopper into which the material to be ground may be placed.

As indicated in Fig. 2, the gear housing 18 is substantially triangular in horizontal cross section, with the grinder head 20 located below one corner 80 of the triangle and with the power shaft 64 located at a second corner 82 of the triangle. At the third corner 84 of the housing, the top plate 74 is provided with a feed opening 86.

The housing itself has a feed passage 88 connecting the feed opening 86 with the interior 22 of the grinding head extension. As shown in Fig. 3, this feed passage 88 is substantially straight and intersects the grinder passage 22 at an acute angle, i. e., at an angle other than perpendicular thereto. Feed passage 88 is substantially circular in cross section.

A pusher member 92 (Fig. 4) of similar cross section is designed for insertion in the feed passage 88 to force the material against the feeding worm 24. This pusher 92 has a handle 94 at its upper end and a food engaging face 96 at its lower end. This face 96 is inclined at an angle to the axis of the pusher, which is substantially the same as the angle of intersection between the feed passage 88 and grinding passage 22. Face 96 is also made concave, with substantially the same radius of curvature as the inner surface of passage 22, in order that the face 96 may fit closely against the worm 24. Thus, when the pusher 92 is fully inserted in passage 88 to the position shown in Fig. 3, the food engaging face 96 of pusher 92 will lie substantially flush with the inner surface of passage 22, and will force all particles of food into the path of the worm.

In order to make certain that the pusher 92 is always oriented properly when it reaches the fully inserted position, cooperating means are provided on the pusher and on another portion of the attachment to guide the pusher 92 into the desired position. In the form shown in Figs. 1 to 4, the cooperating guide means include a longitudinal slot 98 in housing 18 and cover 74 and a cooperating projection 100 on the pusher 92. Projection 100 makes it impossible to insert the pusher in the feed passage 88 in any angular position except that in which the projection 100 will be received in slot 98. Thus the proper angular orientation of the pusher 92 when it reaches the fully inserted position of Fig. 3 is assured.

In order to connect the attachment 16 to the food mixer casing 10, an attaching member 102 is provided. Member 102 includes a manipulating handle extension 104 and a threaded end 106 which passes through an opening 108 in the top plate 74 and also through the aligned opening 110 in the vertical center post 109 of the gear housing 18. An annular gasket 111 having a depending shoulder 113 fits over the upper end of post 109 and provides a tight seal to prevent escape of lubricant or entrance of water or food into the gear casing when member 102 is removed.

Threaded portion 106 is screwed into an internally threaded recess 112 in the food mixer casing 10. Engagement of the shoulder portion 114 of attaching member 102 against the upper surface of top plate 74 will thus hold the food grinding attachment 16 firmly in position insofar as vertical movement is concerned. Furthermore, since the power shaft 64 projects down into the casing 10 to engage the power take-off shaft 69, rotation of the housing 18 around the axis of attaching member 102 will also be prevented.

Thus a very compact construction has been provided in which the food grinding attachment includes a triangular housing with a grinding head extension at one corner, a power shaft at a second corner, and a feed passage at the third corner. Furthermore, the point of attachment of the device to the food mixer casing is located substantially at the center of the triangular housing so that the feed passage is no farther away from the point of connection than is the grinding head. This compact arrangement of the parts adds to the stability of the device, particularly by keeping the feed passage close to the point of connection, since it is at the feed passage that external forces are applied to the device by the operator. Furthermore, the construction provides a minimum of parts which can be readily manufactured in an economical manner. The arrangement of the cover plate of the gear housing as the bottom of a supply hopper for the material to be ground makes it possible to provide a more convenient and larger hopper construction without substantially greater cost. This construction can be readily disassembled when it is necessary to lubricate or check the gearing or other internal mechanism, while at the same time the gearing is fully enclosed so that food particles will not penetrate into it.

The arrangement of the grinding head is such that the worm 24 and associated parts may be readily removed downwardly from the extension 20 and housing 18 for easy cleaning of the parts. The particular pusher construction in combination with the inclined food engaging face and cooperating guide means on the pusher and feed passage make it possible to force all of the desired material into the grinding head so that it will be acted upon by the grinding worm and cutter plates.

In Figs. 5 to 8, inclusive, a modified form of construction is shown. Here the gear housing 116 is substantially similar to the gear housing 18 of Figs. 1 to 4. Similarly, the grinder extension 118, the combination cover and hopper 120 are also similar to the corresponding members 20 and 74 of the earlier embodiment.

In this case, however, the top plate 120 is provided with a feed opening 122 which is flattened on one side at 124. The feed passage 126 in the housing 116 is of similar cross section.

In this case the pusher 128 is substantially circular in order to fit the feed passage 126, but is likewise provided with a flattened section 130 which cooperates with the flattened edge 124 to orient the pusher properly as it is inserted into the feed passage. As a result of such orientation, the inclined and concave food engaging face 132 of the pusher will always assume the position shown in Fig. 6 in which it is substantially flush with the interior surface of the grinding head extension. A suitable handle 134 is formed in this case as a separate member and is connected to the pusher 128 by a pin 135.

In this embodiment of the invention, the attaching member is also slightly different. Here the attaching member 136 (which is threaded through the cover plate 120 and center post 137 of housing 116 into the food mixer casing just as in the previous case) is provided with a noncircular upwardly projecting shaft extension 138. This shaft extension 138 is designed for removable engagement with an operating member 140 having a knob portion 142 and an internal socket 144 corresponding in cross section to the shaft 138. Thus the attaching member 136 can be used to clamp the device to a food mixer part just as in the previous case, except that the separate wrench or operating member 140 is utilized, to reduce the size of the attaching member itself.

It should be noted that in the device of Figs. 5 through 8 the feed passage 126 and the pusher 128 may be considered as having portions of similar, but unsymmetrical cross section, due to the presence of the flattened areas 124 and 130 on these respective members. Obviously, variations in the specific cross section can be utilized without departure from the teachings of the present invention. Similarly, even though the feed passages have been shown as straight longitudinally, it will be equally apparent that the lack of symmetry in the pusher and feed passage which is designed to achieve proper angular orientation of the parts could involve a lack of symmetry in longitudinal cross section instead of in lateral cross section.

Since minor variations and changes in the exact details of construction will be apparent to persons skilled in this field, it is intended that this invention shall cover all such changes and modifications as fall within the spirit and scope of the attached claims.

Now, therefore, I claim:

1. A food grinder attachment for mixers, comprising an open-topped horizontal gear housing having a grinder head and a power shaft extending substantially vertically downwardly from the housing at spaced points thereon, driving connections in the housing between the shaft and grinder head, and a top cover for the housing having an upwardly extending flange defining a supply hopper for the grinder, the cover and housing having aligned openings at a point spaced laterally from both the grinder head and power shaft and providing a feed passage from the hopper to the interior of the grinder head, said passage opening into the side of the grinder head, the feed passage being straight and of uniform cross section and intersecting the grinder head at an acute angle, the attachment also having a removable pusher fitting the passage and having an angular food engaging face substantially flush with the inner wall of the grinder head when the pusher is fully inserted in the passage in one angular position, and interengaging means on the pusher and another portion of the attachment preventing insertion of the pusher in the passage in a different angular position.

2. A food grinder attachment for connection to a power unit comprising an open-topped housing of substantially triangular cross section in a horizontal plane, a vertically depending grinding head including a vertical worm at one corner of the housing, a vertical power shaft at another corner of the housing having an external driving connection at the bottom of the housing for engagement with the power unit, gearing within the housing connecting the power shaft and worm, and a triangular cover member removably attached above the housing, the cover member having an upstanding wall providing a supply hopper and also having a feed opening at the third corner of the housing, the housing having a passage connecting the feed opening to the interior of the grinding head, the relative arrangement of the grinding head, power shaft and feed opening providing for location of both the grinding head and the feed opening immediately adjacent the power unit and thereby minimizing tilting of the unit due to the weight of the grinding head and the insertion of food in said passage.

References Cited in the file of this patent
UNITED STATES PATENTS

| Number | Name | Date |
|---|---|---|
| 2,027,281 | Lista | Jan. 7, 1936 |
| 2,143,202 | Martinet | Jan. 10, 1939 |
| 2,145,421 | Jungbecker | Jan. 31, 1939 |
| 2,223,772 | Waller et al. | Dec. 3, 1940 |
| 2,495,309 | Amstutz | Jan. 24, 1950 |
| 2,524,860 | Vant | Oct. 10, 1950 |

FOREIGN PATENTS

| Number | Country | Date |
|---|---|---|
| 512,805 | Great Britain | Sept. 26, 1939 |
| 586,381 | Great Britain | Mar. 17, 1947 |